May 20, 1924.
W. D. NOTMAN
VISOR
Filed Oct. 30, 1923
1,494,864
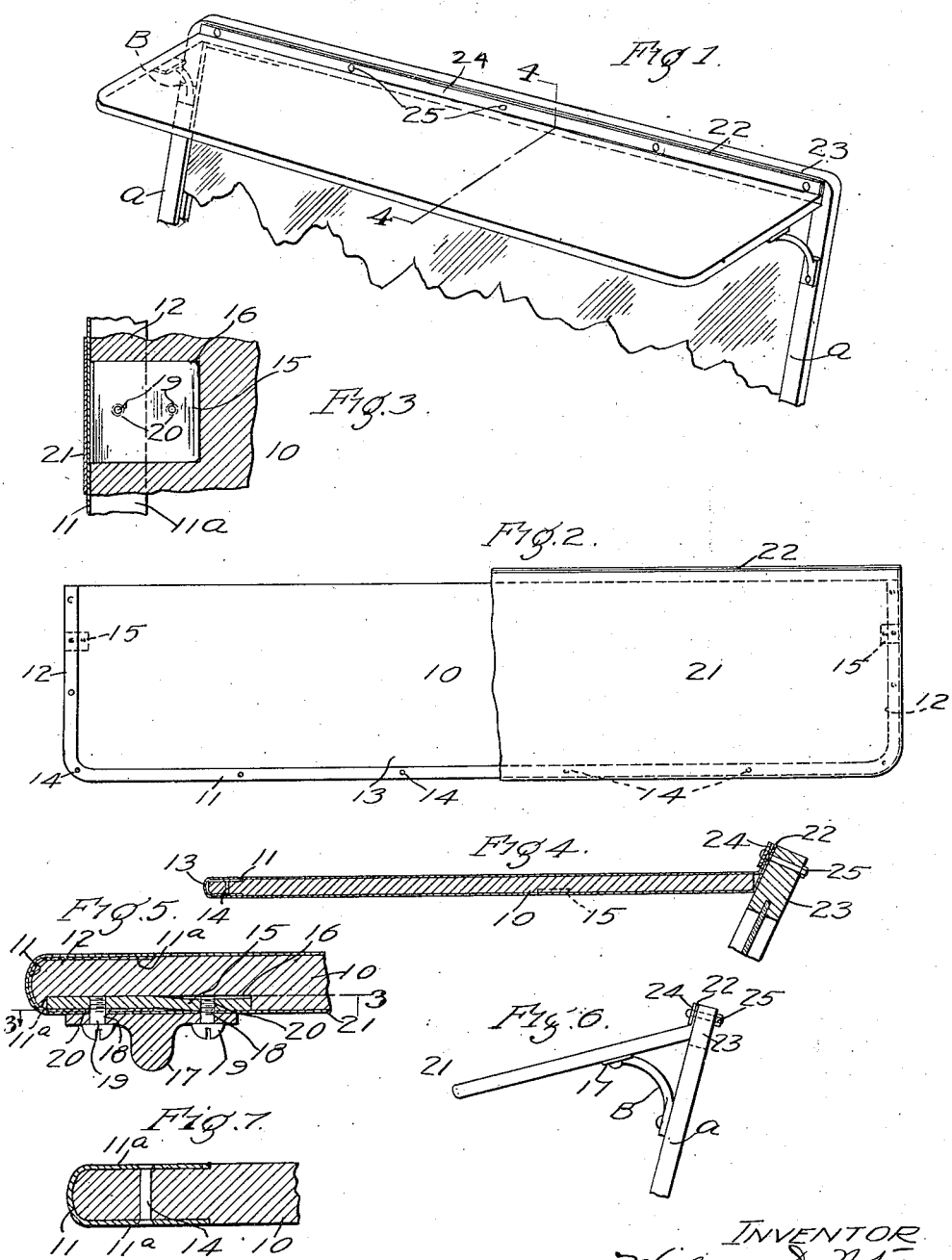
INVENTOR
William D. Notman
by Parker & Brochuow,
ATTORNEYS.

Patented May 20, 1924.

1,494,864

UNITED STATES PATENT OFFICE.

WILLIAM D. NOTMAN, OF BUFFALO, NEW YORK, ASSIGNOR TO McKINNON DASH COMPANY, OF BUFFALO, NEW YORK.

VISOR.

Application filed October 30, 1923. Serial No. 671,641.

*To all whom it may concern:*

Be it known that I, WILLIAM D. NOTMAN, a citizen of the United States, residing at Buffalo, in the county of Erie and State of New York, have invented a new and useful Improvement in Visors, of which the following is a specification.

This invention relates to improvements in visors of the sort used on automobiles and other vehicles and which are adapted to protect the drivers from the glare of direct sunlight and to deflect rain, snow and the like from the windshield of the vehicle.

The objects of the invention are to improve and simplify the construction of devices of this character, and to provide a strong, light-weight visor having smooth surfaces without projecting parts; also to provide a visor of this sort having a light and relatively thin core or body portion and a reinforcing binding or edge member therefor which is so applied that the thickness of the visor is not increased thereby; also to provide the visor with improved and concealed means or parts for attaching the supporting brackets thereto; also to improve visors of this sort in the other respects hereinafter specified.

In the accompanying drawings:

Fig. 1 is a perspective view of a visor embodying the invention, showing the same applied to the frame of an automobile windshield.

Fig. 2 is a plan or face view of the visor showing a part of the flexible cover broken away to disclose the body member and the reinforcing means therefor.

Fig. 3 is a sectional plan view, on an enlarged scale, of the concealed attaching plate of the visor, on line 3—3, Fig. 5.

Fig. 4 is a transverse section of the visor attached to a windshield, on a larger scale, on line 4—4, Fig. 1.

Fig. 5 is a sectional elevation, on a still larger scale, of the visor showing the concealed attaching plate and a portion of a bracket for supporting the visor on the windshield.

Fig. 6 is a side elevation of the visor and one of its brackets in operative position on a windshield.

Fig. 7 is a fragmentary transverse section of the reinforcing strip applied to an edge of the body portion.

As an example illustrative of the preferred embodiment of the invention, the drawings show a visor of the sort adapted to extend from side to side and in front of a windshield and which is preferably inclined downwardly from the upper edge of the windshield frame, or from the front edge of the top or roof of an automobile.

The visor shown includes a body member 10 which is preferably formed of a sheet of suitable light-weight, water proof material, as for instance, certain kinds of compressed vegetable fiberboard. The means for reinforcing and strengthening the edges of the body member 10 and preventing the visor from becoming distorted or warped is preferably in the form of a metal or other strip 11 of U or channel section. This strip 11 extends around and is adapted to embrace the opposite side edges 12 and the front edge 13 of the member 10 and is secured thereon, as by rivets 14. It is desirable that the visor be as thin as possible, consistent with adequate strength so that it may present a good appearance. The reinforcing strip, therefore, is applied to the edges 12 and 13 of the body member in such a manner that the outer faces of the flanges 11$^a$ thereof will lie substantially flush with the faces of the body member, see Fig. 7. By this means the body member 10 is adequately strengthened and its free edges protected, without increasing the thickness thereof and at the same time the strip 11 is securely attached to the edges 12, 13.

The visor is supported in an inclined position on the frame of the vehicle, for example on the windshield A by means of brackets of any suitable kind, the brackets shown being adapted to be secured to the side bars $a$ of the windshield and extend outwardly therefrom and contact with the side edges of the visor at a distance from the windshield. Such brackets B are shown in Figs. 1 and 6.

The present invention contemplates the provision of improved attaching means whereby the visors may be secured to the supporting brackets, the means shown in the drawings for this purpose being in the form of rectangular attaching plates 15. One of the plates is secured at each of the side edges of the visor, and the plates are preferably attached, as by spot welding, to the inner face of one of the flanges 11$^a$ of the reinforcing strip 11. The plates 15 are wider than the width of the reinforcing strip flanges, so that they extend inwardly towards each other beyond the free edges of these flanges. The body member is provided with recesses 16, as shown in Figs. 3 and 5, for the reception of the projecting portions of the plates 15, the material of the body member at the edges 12 being cut away so that the plates 15 may lie substantially flush with the under face of the visor. The brackets B are provided with attaching portions 17 which are preferably provided with holes or apertures 18 for the reception of screws or other fastening devices 19 which pass therethrough into threaded holes 20 in the plates 15, see Fig. 5. The flanges 11ª to which the attaching plates 15 are secured, are also apertured for the passage of the fastening devices 19.

It is desirable to cover the visor after assembling the body member 10 and the strip 11 with the attaching plates 15 thereon, so that the visor will present a neat and finished appearance, and the parts protected against the weather. For this purpose a bag or envelope 21 formed of suitable material, such as leather or water-proof fabric, is provided, and which is of substantially the size and shape of the body member. The bag 21 may be formed in any suitable way, as by sewing two pieces of the material together, preferably along two sides and one end, and then binding the edges, thereby giving the envelope a finished appearance. The visor may then be slipped into the bag and the other end stitched to close the bag and secure the body member within it. The waterproof core or body member 10, before being inserted into the bag, is preferably coated with a waterproof glue which aids in protecting the visor against the weather and holds the covering material firmly to the body member 10 and prevents the covering from stretching and bulging away from the core and keeps it smooth and taut. Preferably the free ends of the material at the back edge of the visor are permitted to extend a short distance beyond the edge of the body portion, as shown at 22, and when the visor is to be attached to a vehicle these free ends are secured to a part of the vehicle, as, for instance, the horizontal top rail 23 of a windshield, or to the front rail of the top of the car, by means of a metal or other strip 24 placed against the edges 22, so that these edges will be clamped between the strip and the part of the vehicle to which it is to be secured. The strip 24 is secured in any suitable manner, as by screws or the like 25 passing through holes in the strip and in the adjacent vehicle part. This means of securing the rear edge of the visor reinforces the body member 10 and prevents warping thereof and also provides a weather-tight joint between the visor and the vehicle part.

The described construction of the visor is very practical, it consists of few parts, is light, rigid and durable and relatively inexpensive to produce, and the attaching means described being concealed within the covering member, permits a secure attachment of the visor to the brackets while the visor nevertheless presents a neat, smooth upper and lower surface and continuous unbroken edges.

I claim as my invention:—

1. In a visor adapted to be secured to a part of a vehicle, the combination of a bracket for supporting said visor on said vehicle part, a body member formed of a sheet of light fibrous material, a reinforcing strip of metal surrounding the edges thereof and having parts lying flush with the opposite faces of said body member, said body member having a recess, and an attaching part on said reinforcing strip extending inwardly into said recess and to which said bracket may be attached.

2. In a visor adapted to be secured to a part of a vehicle, the combination of brackets adapted to engage opposite ends of said visor for supporting said visor on said vehicle part, a body member formed of a sheet of light fibrous material, a reinforcing strip of metal secured to and binding the edges thereof and having parts recessed in and lying flush with the opposite faces of said body member, and oppositely extending, inwardly directed attaching parts on said reinforcing strip adjacent said brackets and to which said brackets are attached, said attaching parts entering into recesses in the opposite edges of said body member.

WILLIAM D. NOTMAN.